United States Patent [19]

LeBlanc

[11] 4,070,920
[45] Jan. 31, 1978

[54] COMPOSITE GEAR HAVING CARBURIZED TEETH AND METHOD OF MAKING SAME

[75] Inventor: Wayne J. LeBlanc, Lyndhurst, Ohio

[73] Assignee: The Horsburgh and Scott Company, Cleveland, Ohio

[21] Appl. No.: 748,935

[22] Filed: Dec. 9, 1976

[51] Int. Cl.² .................. F16H 55/12; B21D 53/26
[52] U.S. Cl. ................................. 74/446; 29/159 R
[58] Field of Search ............... 29/159 R; 74/446, 439, 74/434

[56] References Cited

U.S. PATENT DOCUMENTS

| | | | |
|---|---|---|---|
| 3,461,738 | 8/1969 | Pandjiris et al. | 74/446 |
| 3,530,735 | 9/1970 | Allen | 74/446 |

*Primary Examiner*—Leonard H. Gerin
*Attorney, Agent, or Firm*—Meyer, Tilberry & Body

[57] ABSTRACT

A composite gear made up of a carburized gear ring and separately formed hub and a method of making same wherein distortions in the gear teeth and ring caused by the carburizing process are removed by a special design of hub and welding selected portions of the hub to the ring.

22 Claims, 12 Drawing Figures

COMPOSITE GEAR HAVING CARBURIZED TEETH AND METHOD OF MAKING SAME

BACKGROUND OF THE INVENTION

The invention relates generally to the art of large diameter composite gears and more specifically to a gear comprised of a carburized gear ring and a separately formed hub and a method of making such a gear so as to eliminate warpage or distortions, particularly in the gear teeth, resulting from the carburizing of the gear ring.

In the art of making large gears, it is common to make the gear hub and gear ring separately which are later joined to complete the gear. It is also common to carburize or case harden at least the toothed portion of the gear ring in order to reduce wear on the gear teeth during use.

The term carburizing as used in this specification will be understood to further include the process of case hardening and other similar hardening processes.

The desirable result of carburization is the formation of an outer shell on the treated part which has a higher carbon content, as much as 0.90% or more carbon at the surface, than the underlying, low-carbon steel, generally less than 0.25% carbon, the carburized layer being harder and, thus, more wear resistant than the original part.

Carburization of gears usually causes a warpage of the parts treated which results in the development of a concavity or cupping of the outer edge surfaces of the gear teeth, when viewed in circumferential cross-section which concavity must be removed by machining. The gear ring may also be warped out of round and/or out of its major disk plane so that it may no longer be flat or circular, this being especially true in large gears since quenching presses for gears larger than 36 inches in diameter are unavailable.

Carburized layers are generally only about 0.010 to 0.200 in. thick. Thus, in (0.250 to 5.0 mm) the machining of those portions of the gear which are out of plane and/or machining the gear teeth so the machined surfaces are again true, any substantial machining to eliminate the warpage effects may also reduce or eliminate portions of the carburized layer altogether, thereby losing some or all of its strength and wear-retarding effectiveness. Also, machining the carburized layer is very difficult and time consuming because of the hardness of the metal. In machining a large diameter gear, as much as 250 hours of machining on large and expensive equipment are required to eliminate distortions caused by carburization.

SUMMARY OF THE INVENTION

In accordance with the invention a composite gear is provided comprised of a carburized gear ring mounted on a hub, with a central portion of the hub rim being in substantial pressure engagement with a central portion of the gear ring inner surface and with portions of the hub spaced from, and on both axial sides of the central portion being welded to the gear ring and in radial tension.

Further in accordance with the invention, the gear ring and hub have axially facing surfaces in abutment and one of the welds is in axial tension to hold the surfaces in engagement.

Further in accordance with the invention, a method of manufacturing a composite gear is provided comprising the steps of: providing a carburized gear ring having an inner surface and an outer toothed surface wherein the teeth are cupped in circumferential cross-section as a result of the carburizing; providing a hub having outwardly facing surfaces including a central surface and a pair of surfaces axially spaced from and one on each side of the central surface; shrink-fitting the gear ring around the central surface; arc welding the pair of surfaces to selected portions on the inside of the gear ring; and allowing the welds to cool to develop radial tension forces which pull the axial ends of the gear teeth radially inwardly.

Further, in accordance with the invention, the method may include the additional steps of: providing axially facing surfaces on the hub and gear ring inner surface; placing such surfaces in abutting engagement at the time the gear ring is shrink-fitted onto the hub; providing an axially and radially extending flange on the side of the hub adjacent its axial facing surface which flange has one of the pair of surfaces on its outer end, and arc welding the flange to the inner surface of the gear ring allowing the weld to cool and develop axial tension forces in the flange to press the axially facing surfaces into pressure engagement.

Further in accordance with the invention, the method may include the additional step of preheating the flange before arc welding to develop additional tension forces in the flange during the step of cooling.

Further in accordance with the invention, the method includes the step of developing sufficient tension forces in the flanges to draw the axial ends of the gear teeth into axial alignment with the mid portion when viewed in circumferential cross section.

Further in accordance with the invention, the method includes the step of developing sufficient tension forces in the flanges to draw the axial ends of the gear teeth radially inwardly so that the teeth have a crowned configuration when viewed in circumferential cross section.

Further, in accordance with the invention, the method includes the step of carburizing the entire outer surface of the gear ring, and removing the portions of the inner carburized surface to which the welds are to be made.

The principal object of the invention is the provision of a new and improved composite carburized gear of the general type described which is less expensive to manufacture and requires a minimum or no machining of the teeth after carburizing.

A further object of the invention is the provision of a composite gear made up of a hub and a carburized gear ring wherein the gear teeth have an as-carburized surface of generally uniform thickness.

A further object of the invention is the provision of a composite gear including a hub and a carburized gear ring shrink-fitted together and then welded, the welds having tension forces therein pulling the axial ends of the gear teeth radially inwardly.

A further object of the invention is the provision of a new and improved composite gear of the type described wherein the hub and gear ring have axially abutting surfaces held in pressure engagement by axial tensions in a weld joining the hub and gear ring together.

Another principal object of the invention is to provide a method of manufacturing a composite carburized gear which eliminates cupping distortion of gear teeth caused by the carburization thereof without the need for any or any substantial post-assembly finish machining.

Another object of the invention is to provide a method of manufacturing a composite gear which includes the step of welding selected portions of the gear ring to the hub so as to eliminate cupping distortion in the carburized gear teeth.

Another object of the invention is the provision of a new and improved gear wherein the teeth have an as-carburized surface and a crowned configuration in circumferential cross section so as to alleviate end loadings thereon when in use.

It is an additional object of this invention to provide a gear hub which when welded to a carburized toothed gear ring acts to remove cupping distortion in the gear teeth through tension forces developed between the welded portions of the gear hub and the gear ring at the weld bead.

It is yet another object of this invention to provide a method whereby warpage of gear teeth due to carburization thereof may be corrected with no machining or only slight machining being necessary and without the necessity of machining away all or any portion of the carburized layer on the gear teeth.

It is another object of this invention to provide a method whereby the warpage along the outer surfaces of gear teeth caused by carburization of the gear ring is eliminated by drawing the edge portions of the teeth and gear ring radially inwardly into axial alignment with the central portion of the outer teeth edges thereby necessitating little or no machining of the teeth or their carburized layer to correct such deformity.

it is a still further object of this invention to provide a method of assembling gears which eliminates all or nearly all warpage due to carburization through the welding of the gear hub to the gear ring, such welding accomplishing both the drawing of the gear ring into a plane and the drawing of the warped outer edges of the gear teeth into axial alignment with the center thereof when viewed in circumferential cross-section.

It is yet another object of this invention to provide a method whereby a gear ring which has been shrink-fitted onto a gear hub is welded at the appropriate points to establish positive retention of the ring on the hub which causes the ring to be drawn into round and into the proper plane of the gear disk.

These and other objects are accomplished in the present invention by a novel composite gear design and assembling same through a process to be described hereinafter.

BRIEF DESCRIPTION OF THE DRAWINGS

The invention is illustrated in the attached drawings showing a preferred embodiment including specific parts and arrangements of parts. It is intended that the drawings included as part of this specification be illustrative of the preferred embodiment of the invention and should in no way be considered as a limitation on the invention itself.

DETAILED DESCRIPTION OF THE DRAWINGS AND THE PREFERRED EMBODIMENT

Figure 1:
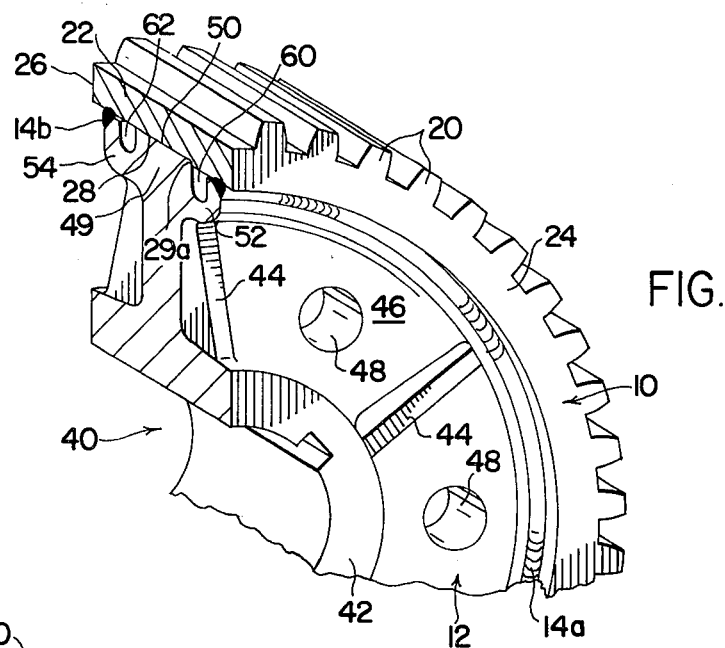
FIG. 1 is a partial perspective view of a composite gear illustrating a preferred embodiment of the invention.

Referring now to the drawings wherein the showings are for the purposes of illustrating a preferred embodiment of the invention only and not for the purposes of limiting same, FIG. 1 shows a composite gear comprised of an outer gear ring 10 shrink-fitted to and then welded to an inner hub 12 by means of a pair of weld beads 14a, 14b between the inner surface of the gear ring 10 and the outer surfaces of the hub 12.

Before assembly with the hub 12, the gear ring 10 is comprised generally of a solid annular ring 22 having an outer surface with a plurality of gear teeth 20 formed thereon, axially facing side surfaces 24, 26 and radially inwardly facing surfaces 28, 30, 32 of differing diameters with the inner surface 28 being disposed intermediate the surfaces 30 and 32 and having a diameter slightly greater than the diameter of the surface 30 and 32 and the diameter of the surface 32 being slightly greater than the diameter of the surface 30.

Because of the difference in diameters between the surfaces 28 and 30, the inner surface of the gear ring 10 has an axially facing shoulder 29 and, because of the difference in diameters between the surfaces 28 and 32, an oppositely facing axial shoulder 33 which shoulder 33, as will appear, it removed during the manufacturing process.

The difference in diameters between surfaces 28 and 32 is preferably at least greater than the depth of the carburized layer which is produced after the teeth are finish machined. The difference in diameter of the surfaces 28 and 30 is substantially greater than the depth of the carburized layer so that after the carburized layer on surface 30 is removed axially facing shoulder 29a remains.

Figure 2A:
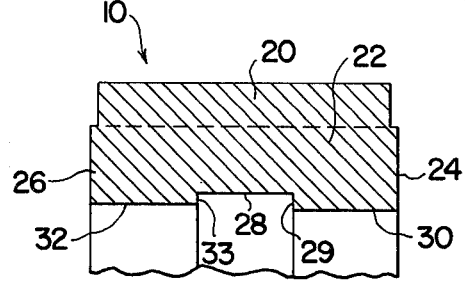
FIG. 2a is a cross-sectional, elevational view of a portion of the gear ring before it has been carburized.

In accordance with the invention, the gear ring 10 is machined to the shape generally shown in FIG. 2a and the gear teeth 20 may be finish machined inasmuch as any warpages or distortions in these teeth caused by subsequent heating for carburizing or otherwise will be removed by subsequent manufacturing steps.

Figure 2B:
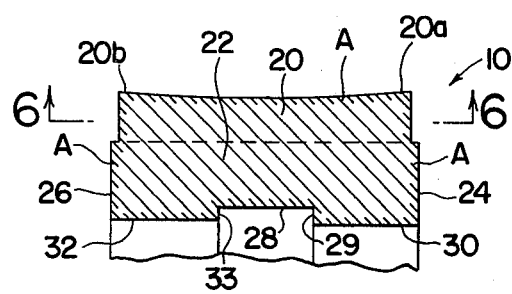
FIG. 2b is a similar view of the gear ring after carburizing.
Figure 6:
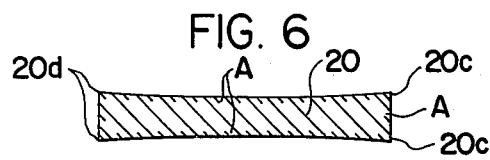
FIG. 6 is a radial outward cross-sectional view of a gear tooth taken along line 6—6 of FIG. 2b.

Thus, the gear ring 10 as shown in FIG. 2a after machining is carburized in accordance with any of the various processes which are well known in the art to produce a surface layer having a higher carbon content. In practice, it is most practical to carburize the entire gear ring including the surface of the gear teeth, the side surface 24, 26, the inwardly facing surfaces 28, 30 and 32 and the shoulders 29 and 33. In FIG. 2b, the carburized layer A is shown as double hatching along the outer surface and the depth of this carburized layer has been exaggerated for the purposes of illustration but will be understood to be of any proper depth depending on the final application of the gear in use. It will also be understood that although referred to as a layer of higher carbon content, there is in reality a decreasing gradient of carbon present inwardly of the surface of the ring. As is known, the carburizing process also tends to make the axial ends of the gear teeth 20 grow in diameter and lateral width resulting in a cupped or dished configuration of the teeth edges in both circumferential and radial cross-section. The raised ends are indicated at 20a, and 20b of FIG. 2b and as shown, they extend radially outwardly beyond the mid-axial portions of the gear teeth 20. FIG. 6 illustrates the lateral widening of the axial ends of the gear teeth 20 after carburization as indicated at 20c and 20d. It is the elimination of these warped portions to which the present invention is primarily directed.

In accordance with the invention, the carburized portions of surfaces 30 and 32 are removed by machining with the amount of metal being removed from surface 32 being greater than or at least equal to the radial width of shoulder 33 such that the machined surface 32a has a diameter at least equal to or greater than the diameter of surface 28. In addition, at least the carburized portion of surface 30 is removed but in the preferred embodiment, the final diameter of the surface 30a is less than the diameter of surface 28 such that a portion 29a of shoulder 29 remains. As will appear, this shoulder 29a after assembly with the hub 12 abuts against planar surface 51a on the hub 12. While shoulder 29a performs an important function, it may in some instances be omitted while still using other portions of the invention.

Figure 2C:
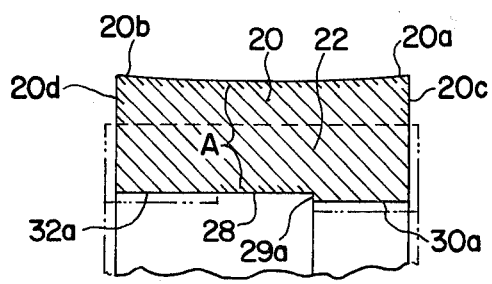
FIG. 2c is a similar view of the carburized gear ring after machining away some of the carburized surfaces, the portions which have been removed being shown in phantom.
Figure 3:
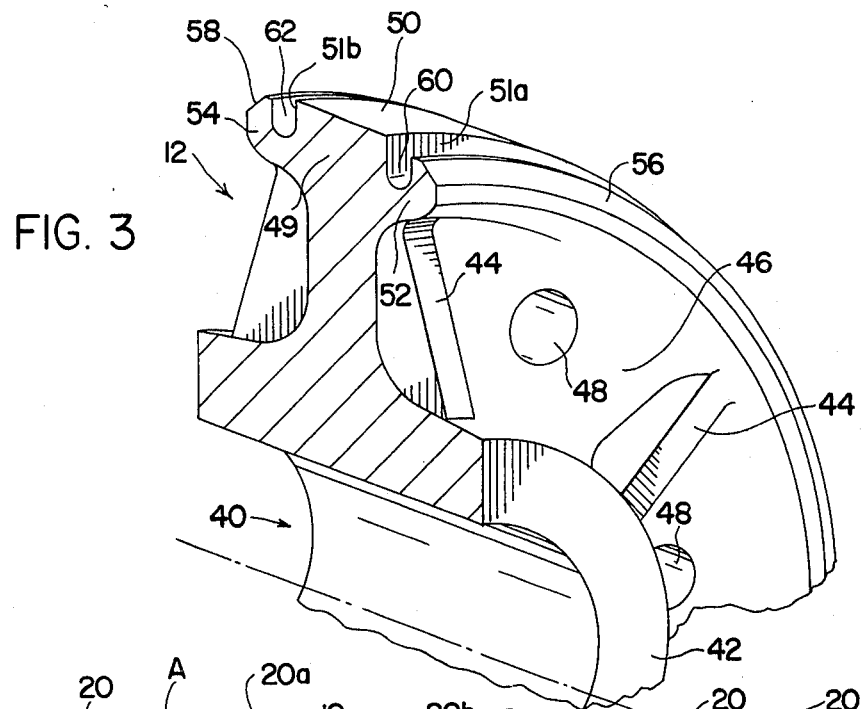
FIG. 3 is a perspective view in partial cross-section of a portion of the preferred form of gear hub.

It is to be noted that the removal of the carburized portions of surfaces 30 and 32 is primarily because it is necessary to weld to these surfaces at a subsequent time in the manufacture of the gear. Welding to a carburized surface may cause cracking and should be avoided. Thus, if carburizing of the surfaces 30, 32 can be prevented during the manufacturing process, such as by masking, it is then possible to start out with the inner surface configuration as shown in FIG. 2c, namely with the cylindrical surfaces 28, 32a of the same diameter and the cylindrical surface 30a having a diameter slightly less than that of the surface 28 so as to still provide the shoulder 29. The carburized portion of surfaces 24, 26 are also preferably machined away although this is necessary only to prevent cracking when the ring is welded at its axially outward edges.

The hub 12 is relatively common in the art having been modified to accommodate the present invention. Thus, the hub 12 has a standard axle-receiving central opening 40, an annular collar 42 surrounding said opening 40, and a series of radially extending spokes 44. Web portions 46 may extend between the spokes 44 for additional strength and openings 48 may be provided therein to reduce the overall weight of the hub.

Spokes 44 and webs 46 extend radially outwardly to an annular mating portion 49 having substantially cylindrical outer surface 50 disposed parallel to the axis of the hub and axially facing planar side surfaces 51a, 51b. Preferably, the surface 50 is carefully machined so as to be substantially cylindrical and at least the surface 51a is machined so as to be substantially planar. It is known in the art to provide a conical outer surface on gear hubs which interfit with conical inner surfaces of gear rings. While the proper alignment of conical surfaces presents some problems, it is possible and thus, contemplated within the scope of this invention that a conical fitting may be provided. For reasons of ease of assembly, however, cylindrical surfaces are preferred. As used in this specification, the term substantially cylindrical will be understood to include a slightly conical form as well as the preferred cylindrical form.

In addition, at ambient temperatures, the diameter of surface 50 is preferably slightly greater than the inner diameter of surface 28 so that upon the heating the gear ring 10 and/or cooling the hub 12, the gear ring 10 may be slipped over the hub 12 and there will be an interference fit between these surfaces when the members return to the same temperature and an abutment area between ring 10 and hub 12 will be created at surfaces 28 and 50. In this way, it will be appreciated that if the gear ring has been warped to an out of roundness condition during the heating of the carburizing process and/or shrink-fitting, this interference fit in the abutment area will force the gear right back to a true cylindrical shape.

Further, in accordance with one aspect of the invention, the shoulder 29a or what remains of it after machining the surface 30 and removing the carburized surface is pressed tightly against the planar surface 51a when the gear ring 10 and hub 12 are assembled and is held in such position until the gear ring 10 and 12 have returned to the same temperature. In this way, the gear ring, if it had warped so as to be nonplanar during the heating for carburizing and/or shrink-fitting, is forced into the planar position and is held in such position after the gear ring and hub have returned to the same temperature.

Further, in accordance with a preferred embodiment of the present invention, the hub 12 also includes a pair of annular flanges 52, 54 which extend radially and axially outwardly from the plane of the surfaces 51a, 51b and from an area spaced radially inwardly of the surface 50 such that their outer ends are spaced axially from the surfaces 51a, 51b respectively to provide air gaps 60, 62 respectively therebetween.

In the preferred embodiment, the flanges 52, 54 have outer surfaces 56, 58 respectively, which are beveled at approximately 45° relative to the axis of the hub and the outermost diameter of the surface 56 is just slightly less than the diameter of the surface 30a while the outermost diameter of the surface 58 is just less than the diameter of the surface 32a. The purpose of the beveling is to enable a weld bead to be deposited in the groove defined by the surfaces 56 and 30a and the surfaces 58 and 32a. It will be understood that this bevel angle may be varied over a relatively wide range depending upon the requirements for the weld which will subsequently be placed in the groove so formed.

Figure 4A:
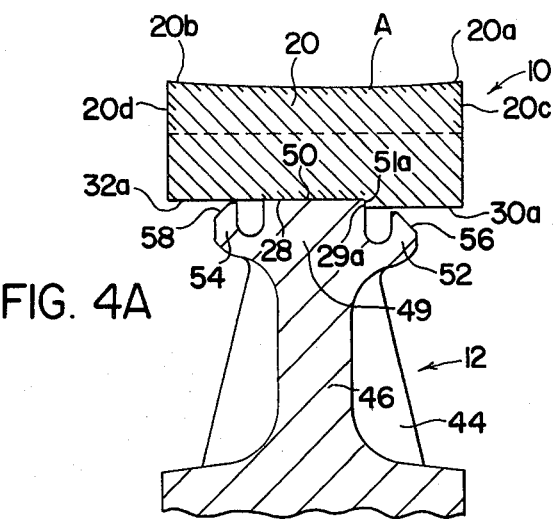
FIG. 4a shows, in cross-sectional elevation, gear hub and gear ring in an interfitting relationship prior to welding.
Figure 4B:
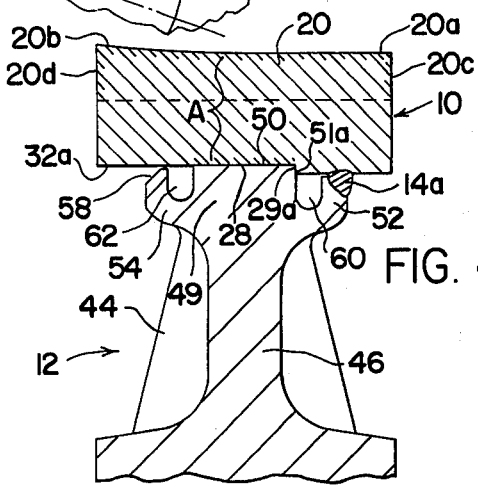
FIG. 4b shows the gear of FIG. 4a with one portion being welded.

The relationship of the hub 12 and the gear ring 10 prior to the welding is shown in FIG. 4a.

In manufacturing the gear in accordance with the invention, the gear ring 10 is first machined generally to the configuration shown in FIG. 2a and as described above. Thus, the gear teeth 20 are completely machined to the final desired shape i.e. the length of the tips are exactly parallel to the axis. Surface 28 is machined to its final ultimate desired diameter. Surfaces 30 and 32 need not be machined to such accurate tolerances. Thereafter, the gear ring 10 is placed in a carburizing oven and the entire outer surface thereof is carburized as is shown in FIG. 2b.

Thereafter, the carburized portion on the surfaces 24, 26 and the carburized portions on the surfaces 30, 32 are machined away such that the surface 32a has a diameter at least equal to if not greater than the diameter of the surface 28 and the diameter of the surface 30a is at least less than the diameter of the surface 28 leaving the shoulder 29a. It will be appreciated that following the carburizing and this machining, the tips of the gear teeth 20 have a slightly concave contour in circumferential cross section as shown exaggerated in FIGS. 2b and 6 it being the purpose of the present invention to eliminate such contour.

Thereafter, the gear ring 10 is heated and/or the hub 12 is cooled such that the diameter of the surface 28 is at least equal to and preferably slightly greater than the diameter of the surface 50. The hub 12 is placed on a flat surface with its axis vertical and surface 51a facing upwardly. The gear ring is then slipped vertically downwardly around surface 50 and is preferably clamped into position such that the shoulder 29a is in firm pressure engagement with the planar surfaces 51a. Obviously the gear ring 10 may be placed on the flat surface first with shoulder 29a facing upwardly and the hub 12 lowered into position with its surface 51a, facing downwardly. The two members are then allowed to return to the same temperature. The surface 28 and surface 50 will thus be in firm pressure engagement. Such shrink-fitting is, of course, conventional.

Thereafter, a weld bead 14a is deposited in the V-shaped groove formed by the surface 30a and the surface 56 by any conventional welding process such as gas, or preferably, arc welding. Such a process fuses a portion of the surface 30a and the outer surface 56 of the flange 52 with deposited weld metal comingling with the fused metal of these two surfaces.

The heat from the welding arc, however, heats the flange 52 such that it will expand both axially and radially outwardly during the time that there is molten metal in the weld pool. Thereafter, the molten metal in the weld pool hardens, and thereafter the flange 52 and the hardened weld metal cool and at the same time shrink radially and axially inwardly. The axial shrinkage pulls the gear ring 10 to the left as viewed in the figures and the shoulder 29a into firmer pressure engagement with the surface 51a. The radial shrinkage of the flange 52 tends to reduce the diameter of the gear ring 10 but inasmuch as there is already an interference fit between the surfaces 28 and 50, the diameter of the gear ring 10 cannot be reduced at this point and in effect, this shrinkage tensions the weld 14a and adjacent portions of the ring and flange, which tension pulls the portion of the gear ring 10 which is spaced axially beyond the surface 50 radially inwardly and this in turn pulls the right hand axial end of the gear tooth 20a radially inwardly reducing its outer diameter and eliminating the cupping effect caused by the earlier carburizing on this axial end 20a of the teeth.

At this point, it will be appreciated that the surfaces 28, 50 are in firm pressure engagement. The shoulder 29a and the planar surface 51a are in firm pressure engagement and the concavity on at least the right hand side of the gear tooth has been eliminated.

Subsequently, the now assembled gear ring 10 and hub 12 are turned over and a weld head 14b laid down in the notch defined by the surface 58 and the surface 32a. The heart from the welding arc again causes the flange 54 to elongate in an axially outwardly and radially outward direction such that when the hardened weld bead 14b and the flange 54 cool, there is a radial contraction resulting in the raised end 20b of the gear tooth 20 being pulled radially inwardly by the tension forces developed in the weld metal and adjacent portions of the flange 54 and ring 10 by the cooling contraction.

Figure 7A:
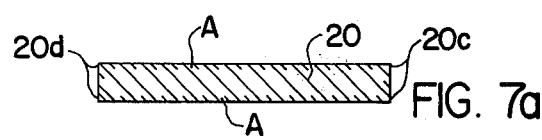
FIG. 7a is a radially outward cross-sectional view of the completed gear tooth taken along line 7—7 of FIG. 4c; and, FIG. 7b is a view similar to FIG. 7a showing the effect of pulling the axial ends of the gear teeth in far enough to cause crowning of the gear teeth.

A cross-sectional view similar to that taken prior to assembly and welding as in FIG. 6, is shown in FIG. 7a after the completion of assembly and welding. The cross section is essentially rectangular since the ends 20a, 20b of the teeth 20 have been drawn downwardly. The surfaces of the teeth are in (or substantially in) an as-carburized condition, i.e. no machining (or a very minimum) is done to the teeth after the carburizing process.

The development of additional tension forces in the welded gear may be desirable. Thus, in accordance with the invention, the flanges 52, 54 may be preheated prior to welding so that an additional elongation over that developed by the heat of welding is realized in the flange prior to welding. The cooling contraction of the preheated and subsequently welded flanges causes a higher tension force to be developed in the welded portions of the gear than developed without preheating.

By proper proportioning of the dimension of the flanges 52, 54 and the width of the gaps 60, 62, or employing the above described preheating of flanges 52, 54 it has been found possible to completely eliminate any cupping or outward curvature in the tips of the gear teeth when viewed in a circumferentially facing cross-section. The axial ends of the gear teeth surfaces are axially aligned with the mid portion. The gear may be placed in use without any further machining, that is to say the surfaces of the teeth are in (or substantially in) an as-carburized condition.

Figure 7B:
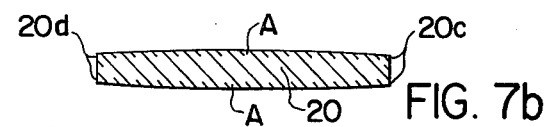
Figure 4C:
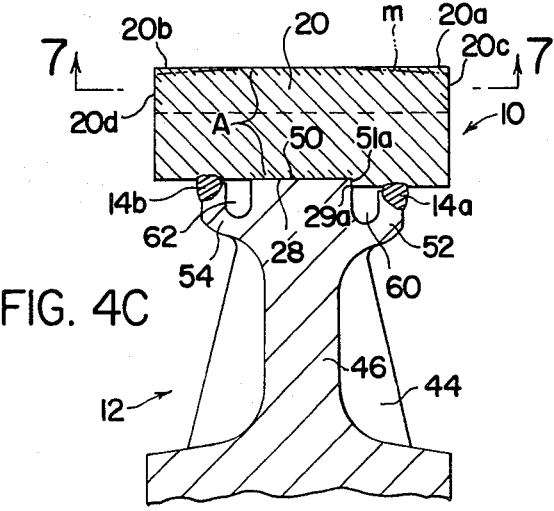
FIG. 4c shows the gear in completed condition.

Through any of the above-described methods for controlling the tension forces, it is also possible to draw the axial ends 20a, 20b radially inwardly beyond mid portion so that the outer surfaces of the gear teeth have a slightly crowned configuration as indicated by dotted line $m$ in FIG. 4c. By crowning of the teeth, the circumferential width of the axial ends of each tooth at the pitch line and elsewhere at corresponding radii is reduced to less than that at the mid portion. FIG. 7b shows this effect greatly exaggerated. Heavy loading on the axial ends 20a, 20b of the teeth 20 during use can be avoided and/or alleviated.

Illustrating dimensionally a composite gear in accordance with the preferred embodiment shown in the figures, a gear ring having an outer diameter at the outer surface of the teeth 20 of 41 inches and an inner diameter at inner surface 18 of 33.750 inches (86.738 cm) is provided as shown in FIG. 2a. Shoulder 29 is approximately 0.750 inches (1.928 cm) in depth and shoulder 33 is approximately 0.500 inches (1.285 cm) in depth. After carburizing, portions 30 and 32 are removed so that surface 30a has a diameter of 33.500 inches (86.100 cm) and surface 32a has a diameter of 33.750 inches (86.738 cm) as does inner surface 28. Shoulder 29a is 0.250 inch (0.643 cm) in depth.

Hub 12 is provided having a diameter at outer surface 50 of 33.772 inches (86.794 cm) and a width of 3.5 inches (8.995 cm) at surface 50. Flanges 52 and 54 are approximately 0.62 inches (1.59 cm) in width and spaces 60 and 62 are approximately 1 inch (2.57 cm) in width. Flange 52 has a maximum diameter of 33.470 inches (86.018 cm) while flange 54 has a maximum diameter of 33.720 inches (86.660 cm).

It can thus be seen that the diameter of outer surface 50 is about 0.022 inch (0.057 cm) greater than the diameter of the ring inner surface 28. The ring is then heated to enlarge the diameter at surface 28 and allow the shrink-fitting of the ring 10 onto hub 12 at which point the assembly is cooled and a shrink fit is established between the hub and gear ring and the assembly is in the condition shown in FIG. 4a. It will be seen that flange 52 is now spaced 0.300 inches (0.771 cm) from surface 30a and similarly, flange 54 is spaced 0.030 inches (0.077 cm) from surface 32a.

From this point, welding in accordance with the steps outlined above between flange 52 and surface 30a and between flange 54 and surface 32a is completed, the tension forces developed through the contraction of the weld metal, flanges and adjacent portions of the gear ring causing a cupping distortion of approximately 0.125 inches (0.321 cm) to be removed and the outer edges of gear teeth 20 to no longer be cupped but have a straight line cross-sectional shape.

Figure 5:
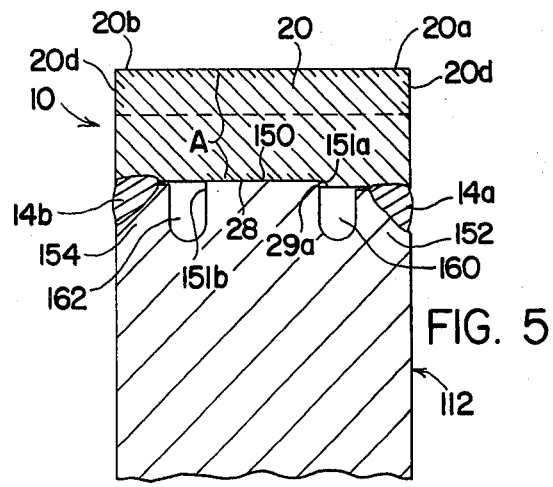
FIG. 5 is a view similar to FIG. 4c showing an alternative embodiment of the invention.

FIG. 5 shows an alternative preferred embodiment of the invention. Here a relatively thick hug 112 is provided which is machined annularly around its outer surface 150 to provide a pair of radially extending annular flanges 152, 154 adjacent the outer surface 150 and having annular spaces 160, 162 between the flanges 152, 154 and inner surfaces 151a, 151b adjacent outer surface 150.

FIG. 5 is a view which is at the point of assembly similar to that shown in FIG. 4C. A gear ring 10 has been machined, carburized, further machined at the surfaces 30a, 32a which are to be welded and then shrink-fitted over the hub 112 at surfaces 28 and 150, with surface 151a abutting shoulder 29a in the same manner as that shown in the outer figures. Flanges 152, 154 are then welded to surfaces 30a and 32a in accordance with the invention and similar to the other embodiment. In the embodiment shown in FIG. 5 however, there is no axial tension produced in flanges 152, 154, such flanges being placed only in radial tension by the contraction of welds at 14a and 14b.

While the invention has been described in relation to specific parts and arrangements of parts, other embodiments have been suggested and still other embodiments will occur to those skilled in the art. It is intended that all such embodiments be included within the scope of this invention as limited only by the scope of the appended claims.

Having thus described my invention I claim:

1. A composite gear comprising:
   a circular gear ring having an inner surface and an outer surface having a plurality of gear teeth; and, a circular gear hub having a pair of axially facing sides and an outer surface, at least midportions of said hub outer surface being in substantial pressure abutment with midportions of said ring inner surface creating a central abutment area, and a pair of cylindrically extending weld beads between said ring inner and hub outer surfaces each axially spaced from axially opposite edges of said abutment area, said weld beads and the adjacent portions of said ring and hub being at least in radial tension.

2. The composite gear as described in claim 1 wherein portions of said hub and gear ring between said welds and said abutment area are in at least less than substantial pressure engagement.

3. The composite gear as described in claim 1 wherein portions of said hub and gear ring between said welds and said abutment area are in non-pressure engagement.

4. The composite gear as described in claim 1 wherein portions of said hub and gear ring between said welds and said abutment area are spaced radially from each other.

5. The composite gear as described in claim 4 wherein said welds extend from said portions of said inner surface to a pair of radially extending annular flanges on said hub, said flanges being spaced axially from portions of said sides adjacent said abutment area and forming a pair of annular grooves therebetween.

6. A composite gear as described in claim 1 wherein said hub includes a pair of annular flanges having circular end edges, said flanges extending both axially and radially outwardly from respective sides of said hub from a circular area spaced radially inwardly of said outer surface, said end edges being axially spaced from corresponding axial edges of said abutment area and said corresponding side, said weld beads being between said end edges and said inner surface.

7. The composite gear as described in claim 6 wherein a portion of said inner surface adjacent said abutment area has a diameter less than that of said inner surface forming an axially facing shoulder, said shoulder abutting the corresponding side of said hub adjacent said abutment area and axially inwardly of the corresponding flange.

8. The composite gear as described in claim 7 wherein said flanges are also in axial tension.

9. The gear of claim 1 wherein the surfaces of the teeth are in an as-carburized condition.

10. The gear of claim 9 wherein the outer tips of the gear teeth are straight as viewed in circumferential cross section.

11. The gear of claim 9 wherein the tips of the gear teeth are crowned when viewed in circumferential cross section.

12. The gear of claim 1 wherein the surfaces of the teeth are carburized and unmachined after carburizing.

13. A gear hub having a pair of parallel, circular, axially facing sides and an outer surface extending axially therebetween, and an integral annular flange extending both axially and radially outwardly from each of said sides from a circular area radially inwardly of said outer surface, said flanges each having an outer edge surface spaced axially from said side adjacent said outer surface and a diameter less than said outer surface.

14. A method of making a composite gear comprising the steps of:
   providing a circular gear ring having an inner surface and an outer surface comprised of a plurality of gear teeth and a circular gear hub having a pair of axially facing sides and an outer surface, said inner and outer surfaces each having midportions and axially adjacent portions;
   positioning said hub within said gear ring so that midportions of said hub outer and ring inner surfaces are in pressure abutment;
   welding said ring to said hub at a line axially spaced from each axial edge of said abutting midportion, and
   cooling said welded gear and hub whereby upon cooling, said welded portions are placed in radial tension and said midportions are in pressure abutment.

15. A method of assembly of a gear wherein said gear comprises an annular gear ring having teeth formed in the outer surface thereof and an cylindrical inner surface, and a gear hub having first and second parallel sides and an outer cylindrical surface extending therebetween, said hub outer surface having an interference fit with said ring inner surface, said hub also having first and second annular flanges extending both radially and axially outwardly from an area on said first and second sides respectively inwardly of said hub outer surface, said method comprising the steps of:
 carburizing at least said teeth of said gear ring;
 locating said hub coaxially within said ring;
 welding said first annular flange to said inner surface of said ring and
 welding said second annular flange to said inner surface of said ring whereby upon the cooling of said welds, any distortion of said teeth or said gear ring caused by the step of carburizing is removed.

16. The method as described in claim 15 wherein said step of locating includes the step of shrink-fitting said ring onto said hub.

17. The method as described in claim 15 wherein said step of carburizing includes carburizing all of said ring and further including the step of removing at least a portion of the carburized inner surface of said ring.

18. The method as described in claim 15 further including the step of preheating each of said first and second flanges prior to the step of welding each of said flanges.

19. The method as described in claim 15 wherein said steps of welding and cooling develop tension forces in said welds sufficient to draw said outer edges of said teeth into a straight-line configuration when viewed in circumferential cross-section.

20. The method as described in claim 15 wherein said steps of welding and cooling develop tension forces in said welds sufficient to draw said teeth into a crowned configuration when viewed in circumferential cross-section.

21. In the assembly of a large diameter bull gear comprising a gear ring having a toothed outer surface and an inner surface comprised of a cylindrical abutment area having an inner diameter and axially adjacent first and second cylindrical welding portions having unequal first and second diameters respectively both of which are less than said inner diameter and a hub portion having a coaxial interference fit with said inner diameter; said hub portion having a pair of axially facing circular sides and an outer surface extending therebetween and a pair of annular flanges extending both radially and axially outwardly from opposite sides of said hub at a point inwardly of said outer surface, a method comprising the steps of:
 carburizing said gear ring;
 removing a portion of said inner surface at said first diameter so that a first cylindrical welding surface having a diameter greater than said first diameter but less than said inner diameter remains thereby creating a stepped shoulder between said first welding surface and said mating portion;
 removing said second inner portion so that a second welding surface is created having a diameter equal to said inner diameter;
 positioning said gear hub within said gear ring adjacent said shoulder;
 welding said first annular flange to said first welding surface and,
 welding said second annular flange to said second welding surface.

22. The method as described in claim 21 wherein said step of positioning includes the step of shrink-fitting said gear ring onto said hub.

* * * * *

UNITED STATES PATENT AND TRADEMARK OFFICE
CERTIFICATE OF CORRECTION

PATENT NO. : 4,070,920
DATED : January 31, 1978
INVENTOR(S) : Wayne J. LeBlanc

It is certified that error appears in the above-identified patent and that said Letters Patent are hereby corrected as shown below:

Column 1, line 40, after "0.200 in." insert---(0.250 to 5.0 mm)---and after "in" cancel ---(0.250 to 5.0 mm)---

Column 4, line 48, "it" should read---is---

Column 6, line 24, "right" should read---ring---

Column 7, line 67, "head" should read---bead---

Column 8, line 1, "heart" should read ---heat---

Column 9, line 25, "hug" should read ---hub---
line 38, "outer" should read ---other---

Column 10, line 58, after "said" insert---ring---
line 59, after "and" (first occurrence) insert ---hub---

Signed and Sealed this

Fifth Day of September 1978

[SEAL]

Attest:

RUTH C. MASON
Attesting Officer

DONALD W. BANNER
Commissioner of Patents and Trademarks